3,098,730
Patented July 23, 1963

3,098,730
GRINDING WHEELS HAVING UNSATURATED ORGANIC POLYMERIC BONDS AND THE LIKE
Robert A. Rowse, Shrewsbury, Mass., assignor to Norton Company, Worcester, Mass., a corporation of Massachusetts
No Drawing. Filed July 22, 1959, Ser. No. 828,717
6 Claims. (Cl. 51—298)

The invention relates to grinding wheels and other abrasive products having unsaturated polymeric organic bonds, especially such wheels having rubber mixed with phenolic resin as bond but also with rubber alone or with butadiene polymers or copolymers and in fact any polymer having an unsaturated group.

One object of the invention is to provide organic bonded grinding wheels of greater strength when subjected to moisture. Another object of the invention is to provide organic bonded grinding wheels which are resistant to deterioration by water. Another object is to provide organic bonded grinding wheels which are more stable and consistent in grinding action. Another object is to make grinding wheels that are more durable and last longer in use, especially under wet grinding conditions, and have a satisfactory rate of cut and uniformity of action throughout their life. Another object is to make grinding wheels that are more duplicatable from wheel to wheel and order to order. Another object is to make grinding wheels that are capable of being operated with greater safety against breakage, particularly in the wet condition. Another object is to make grinding wheels that are operable at higher speeds giving faster rates of stock removal with equal or better safety, particularly in the wet condition.

Another object is to obtain greater strength of adhesion in abrasive products between the abrasive grains and unsaturated polymeric organic bonds and the like, particularly in the wet condition.

Other objects will be in part obvious or in part pointed out hereinafter.

In accordance with the invention I coat abrasive with silicone resins and then make grinding wheels therefrom using organic bonding material of one of the kinds above mentioned. Such wheels show far greater resistance to deterioration by water than do grinding wheels heretofore known.

For purposes of calculating the surface area of abrasive grains of different grain sizes, the inches diameter of a sphere that just equals the screen opening of a standard U.S. screen of the same nominal size designation as the abrasive grain, is considered to equal the middle length axis of an orthorhombic bipyramid of axial ratio 1:2:4 which is taken to represent a geometrical approximation of the shape of average abrasive grains, and whose surface area and volume are therefore considered to correspond to the area and volume of the abrasive grains of that nominal size.

The inches dimension of the screen opening is called $h$ in our mathematical formula, which is $$\text{Gms. silicone/sq. cm. abras. surf. area} = \frac{\text{gms. silicone/lb. abras.}}{/h}$$

where $k$ is a proportionality factor that depends inversely on the density of the abrasive grain and $h$ is the diameter of a sphere in inches that is equal to the screen opening corresponding to the abrasive size designation. The surface area in square centimeters of one pound of abrasive is therefore $k/h$.

For aluminum oxide abrasive, $k=621$
For silicon carbide abrasive, $k=767$

EXAMPLE I

*Treatment of Abrasive*

I weighed out 25 pounds of silicon carbide abrasive, 60 grit, and placed it in a vertical spindle mixing machine. I then weighed out 0.085 pound of silicone resin solution which was a solution of vinyl polysiloxane and toluene, and added it to the abrasive. The machine was run until all the abrasive was uniformly coated with the silicone resin. Two more 25-pound batches were made the same way until a total of 75 pounds of abrasive had been treated. The treated abrasive was then air dried for approximately one hour, then heated at 25° C. for two hours, then subsequently heated at 275° C. for one hour. The treated abrasive when cooled was then ready for use in abrasive wheels. The weight of silicone resin was calculated to be $1.0 \times 10^{-5}$ grams per square centimeter of abrasive surface.

*Manufacture of Abrasive Wheel*

A mixture containing the silicone-treated abrasive was prepared according to the following formula:

| | Weight percent |
|---|---|
| Silicone-treated SiC, 60 grit | 77.0 |
| Natural rubber, liquified by heat | 5.3 |
| Powered sulfur | 2.7 |
| Powered two-sage phenolic resin | 10.7 |
| Powdered clay | 4.3 |

The silicone-treated abrasive was placed in a mixing machine and the liquid rubber and sulfur in the above proportions were added. After these ingredients had been thoroughly mixed for ten minutes, the powders of phenolic resin and clay were added and the additional mixing time was about another five minutes.

I weighed out 4.31 pounds of the mix and placed it in a mold to make 8 3/16" diameter x 1 1/16" thick x 1" hole wheel. I then cold pressed the wheel to 1 1/16" thickness to a weight per unit volume of 2.16 grams/cc., total pores being calculated to be about 12% of the bulk wheel volume. The wheel was then stripped from the mold, placed in an air-circulated oven which was heated rapidly to 100° ±5° C., maintained there for about 10 hours, raised at about 1.6° C. per hour to 160° C. and shut off. After cooling to room temperature, the wheel was finished to size 8 x 1 x 1" in the usual manner for grinding wheels. Several wheels were made according to this formula. Comparison wheels were also made with untreated abrasive in otherwise identical manner.

EXAMPLE II

In this example I used 46 grit aluminum oxide abrasive and I used four different amounts of the same silicone resin of Example I, listing these as Examples II–A, II–B, II–C, and II–D.

Treatment of Abrasive

| Example No. | Weight of silicone resin solution per 30 lb. of 46 grit aluminum oxide grain, lb. | Weight of silicone resin in grams/cm² of abrasive surface area |
|---|---|---|
| II-A | 0.0039 | $6.5 \times 10^{-7}$ |
| II-B | 0.0269 | $4.5 \times 10^{-6}$ |
| II-C | 0.0518 | $8.7 \times 10^{-6}$ |
| II-D | 0.0768 | $1.3 \times 10^{-5}$ |

Each of the above lots of grain were mixed, dried and then heat-treated as in Example I.

Wheels of finished size 8 x 1 x 1" were manufactured using the treated abrasive tabulated above. The following formula was used:

|   | Weight percent |
|---|---|
| Silicone-treated aluminium oxide | 84.0 |
| Natural rubber, liquefied by heat | 3.2 |
| Powdered sulfur | 1.6 |
| Powdered two-stage phenolic resin | 6.3 |
| Iron pyrites powder | 4.9 |

The 8 x 1 x 1" wheels were pressed to a weight per unit volume of 2.44 grams/cc., total pores being calculated to be about 24% of the bulk wheel volume.

Comparison wheels were also made with untreated abrasive in otherwise identical manner.

EXAMPLE III

In this example #46 grit silicon carbide abrasive grain was used. Since the weight of silicone resin solution per pound of abrasive grain was the same as for Example II, the actual weight of silicone resin per square centimeter of abrasive surface area calculates out to be slightly less, as shown in the following table, but the amount that these values are less is not considered to be significant.

Treatment of Abrasive

| Example No. | Weight of silicone resin solution per 30 lb. of #46 grit SiC grain, lb. | Weight of silicone resin in gms./cm² of abrasive surface area |
|---|---|---|
| III-A | 0.0039 | $5.3 \times 10^{-7}$ |
| III-B | 0.0269 | $3.6 \times 10^{-6}$ |
| III-C | 0.0518 | $7.0 \times 10^{-6}$ |
| III-D | 0.0768 | $1.1 \times 10^{-5}$ |

Within the limits of experimental variations and caculation, these amounts of silicone per square centimeter of abrasive surface area are considered to be about the same as for the #46 grit aluminum oxide abrasive.

The procedures were the same as for Example II; the wheel formula was as given below; and the weight per unit volume of the molded wheel was 2.05 grams/cc., total pores being calculated to be about 24% of the bulk wheel volume.

|   | Weight percent |
|---|---|
| Silicone-treated SiC | 81.0 |
| Natural rubber, liquefied by heat | 3.8 |
| Powdered sulfur | 1.9 |
| Powdered two-stage phenolic resin | 7.5 |
| Iron pyrites powder | 5.8 |

EXAMPLE IV

*Preparation of Treating Solution From Vinyl Silane*

I weighed out 9.90 pounds of water and added it to a porcelain container. To this I added 0.91 gram of sodium hydroxide and stirred until completely dissolved. I then added 45 grams of a different vinyl silicone and mixed thoroughly. After 15 minutes, this solution was ready for application to the abrasive.

*Treatment of Abrasive*

I weighed out 125 pounds of aluminum oxide abrasive, 60 grit, and placed it in a vertical spindle mixing machine. I then added 1100 cc. of the above vinyl silane solution to the abrasive.

The mixer was run until the abrasive was uniformly coated with the vinyl silane solution. The treated abrasive was then heated at 125° C. for 12 hours and when cooled was ready for use. The weight of silicone resin was calculated to be $1.4 \times 10^{-6}$ grams per square centimeter of abrasive surface.

Manufacture of Abrasive Wheel

Mixes containing the vinyl silane-treated abrasive were prepared according to the following formulas:

| Mix number | 1 | 2 | 3 |
|---|---|---|---|
| Silicone-treated aluminum oxide abrasive, 60 grit, weight percent | 81.4 | 80.5 | 79.7 |
| Natural rubber, liquified by heat, weight percent | 4.3 | 4.5 | 4.7 |
| Powdered sulfur, weight percent | 2.2 | 2.3 | 2.4 |
| Powdered two-stage phenolic resin, weight percent | 8.6 | 9.0 | 9.4 |
| Powdered clay, weight percent | 3.5 | 3.7 | 3.8 |
| Pressed to weight per unit volume, grams/cc. | 2.52 | 2.55 | 2.58 |
| Calculated volume percent of total pores, percent | 14 | 12 | 10 |

These mixes were prepared in the same manner described in Example I.

From each of these mixes were made six 12 x 1 x 4" wheels and one 20 x 4 x 12" wheel. The wheels were placed in an air circulating oven and cured as described in Example I.

TEST RESULTS

Results of Example I

Speed strengths were obtained, after immersion in 80° C. water for extended periods of time, on the 8 x 1 x 1" wheels made from the treated abrasive as described in Example I and from the corresponding untreated abrasive.

|   | Speed strength, s.f.p.m. | | |
|---|---|---|---|
|   | Dry | 15 days in 80° C. water | Loss |
| Silicone-treated abrasive | 25,800 | 20,000 | 5,800 |
| Untreated abrasive | 28,250 | 14,250 | 14,000 |

Dry wheels were tested in the dry condition. Wheels soaked in water were tested in the wet condition immediately after removing from the water. The numbers indicate the speed at breaking in surface feet per minute (s.f.p.m.) of the wheels. In each test only one wheel was broken.

Results of Examples II and III

SPEED STRENGTH

Wheels were broken in speed tests after soaking six days in water at room temperature (about 22° C.).

| Specification | Approx. grams silicone resin per sq. cm of abras. surf. area | Average breaking strength s.f.p.m. wet, after 6 days in 22° C. water | Improvement, s.f.p.m. | Percent |
|---|---|---|---|---|
| II #46 aluminum oxide | None | 9,050 | | |
| II-A | $6 \times 10^{-7}$ | 12,850 | 3,800 | 42 |
| II-B | $4 \times 10^{-6}$ | 15,800 | 6,750 | 75 |
| II-C | $8 \times 10^{-6}$ | 16,800 | 7,750 | 86 |
| II-D | $1 \times 10^{-5}$ | 15,100 | 6,050 | 67 |
| III #46 silicon carbide | None | 13,300 | | |
| III-A | $6 \times 10^{-7}$ | 17,450 | 4,150 | 31 |
| III-B | $4 \times 10^{-6}$ | 18,800 | 5,500 | 41 |
| III-C | $8 \times 10^{-6}$ | 19,500 | 6,200 | 47 |
| III-D | $1 \times 10^{-5}$ | 18,700 | 5,400 | 41 |

Three wheels of each item were tested in each condition.

Results of Example IV

SPEED STRENGTH

[Wheel size: 12 x 1 x 4"]

Three wheels of each item were broken in speed tests in the dry condition and also after immersion in water for ten days at room temperature (about 22° C.). These results are tabulated below:

| Mix No. | | Dry, s.f.p.m. | Percent of treated dry value | Wet, after 10 days in R.T. water s.f.p.m. | Percent of treated dry value |
|---|---|---|---|---|---|
| 1 | Untreated | 23,500 | 101 | 11,600 | 50 |
|   | Treated | 23,300 | 100 | 22,700 | 97 |
|   |   |   |   | +11,100 | Improvement |
| 2 | Untreated | 23,300 | 96 | 12,800 | 52 |
|   | Treated | 24,400 | 100 | 22,800 | 93 |
|   |   |   |   | +10,000 | Improvement |
| 3 | Untreated | 24,700 | 99 | 13,100 | 52 |
|   | Treated | 25,000 | 100 | 22,700 | 91 |
|   |   |   |   | +9,600 | Improvement |

Thus it is seen that the wheels tested wet after soaking 10 days in water at room temperature had over 90% of the rotational speed breakage value for similar unsoaked wheels tested in the dry condition. It is likewise seen that a very large difference exists in the "percent of treated dry value" column for the treated wheels tested in the wet condition and the untreated wheels tested in the wet condition. This differential percent, which I refer to as the "speed difference relative to the control" is 47%, 41%, and 39% respectively for the items in the table. Speed strength increases of 3% or more, achieved by the invention, are considered to be advantageous and useful, and this desirable improvement applies to the "speed difference relative to the control."

It is a well known fact that the rotation of a grinding wheel causes stress to be generated which is proportional to the square of the speed. Therefore, to convert a grinding wheel speed test to destruction, into the stress that is present in the wheel structure at failure, which measures the strength of the wheel structure, one must square the speed results. Thus the true importance of degree of improvement achieved by my invention becomes much more apparent when converted to strength comparisons by squaring the speed tests to destruction. This more than doubles the improvement that exists between the speed breakage results for the treated wheels tested wet as compared to the untreated wheels tested wet.

WET GRINDING RESULTS

Wheel size: 20" x 4" x 12"
Machine: Centerless grinder, #2 Cincinnati
Wheel speed: 6,500 s.f.p.m.
Through feed grinding, 3 passes per test (15, 4, and 1 mil)
Material: 52100 hardened steel, Rockwell C60 1" round x 5" long, 200 pieces each test
Coolant: Soluble oil 2% by volume in water Data:

| Mix No. | Abrasive | Grinding test No. | Wheel wear, mils |
|---|---|---|---|
| 1 | Untreated | 1 | 108.0 |
|   | Treated | 2 | 33.0 |
| 2 | Untreated | 3 | 65.0 |
|   | Treated | 4 | 31.5 |
| 3 | Untreated | 5 | 44.0 |
|   | Treated | 6 | 30.5 |

In order to determine whether the improvement of bonding strength shown in my examples was due to the rubber (unsaturated polymer) or to the phenolic resin, I made the following tests comparing phenolic resin bonding vs. the invention wheels with rubber-phenolic resin bonding.

*Test #1—Comparison with Example I.*—I treated abrasive exactly as described in Example I with the same silicone resin and subjected the treated abrasive to the same heating cycle as described in Example I. I then manufactured a phenolic resin bonded grinding wheel without any rubber or other unsaturated organic polymer in the bond, according to the following formula:

| | |
|---|---|
| Silicone treated SiC, 60 grit | 84.8 weigh percent. |
| Powdered two stage phenolic resin | 13.7 weight percent. |
| Calcium Oxide | 1.5 weight percent. |
| Furfural | 55 cc./lb. of resin. |
| Neutral anthracine oil | 20 cc./lb. of resin. |

Wheels of size 8 3/16 x 1.025 x 1" were molded to a density of 1.96 gm./cc. (total pores being calculated to be about 26% of the bulk wheel volume) using 3.72 lbs. of mix. The wheels when stripped from the mold were placed in an oven and cured at a top temperature of 185° C. for at least one hour. After cooling to room temperature the wheels were finished to size 8 x 1 x 1" in the usual manner for grinding wheels.

Companion wheels with the same phenolic resin bond were also made with untreated abrasive in otherwise identical manner. The Example I wheels themselves along with their untreated abrasive control wheels constitute comparison wheels made in accordance with my invention employing rubber-phenolic resin bond.

Test results on the wheels were as follows:

| Wheel bond | Abrasive | Speed test to destruction (s.f.p.m.) | | |
|---|---|---|---|---|
| | | Dry | Wet, soaked 15 days in water at 80° C. | Wet strength improvement |
| Phenolic resin | Untreated | 26,600 | 17,500 | |
| Do | Treated | 17,200 | 10,700 | [1] −6,800 |
| Rubber-phenolic resin | Untreated | 28,250 | 14,250 | |
| Do | Treated | 25,800 | 20,000 | +5,750 |

[1] Decrease.

A check test was made in a similar manner with wheels of size 6 x 13/16 x 1" and the results were substantially the same.

Thus there is a tremendous difference between the effect of the vinyl silicone treatment with the two kinds of wheel bonds. This effect was actually seriously adverse in the case of the phenolic resin bond, compared to a big improvement in the case of the rubber-phenolic resin bond.

*Test #2—Comparison with Example IV.*—I then made phenolic resin bonded abrasive wheels using the same vinyl silane as in Example IV. The abrasive was treated in a similar manner as described in Example IV except that about 60 cc. of the 1% vinyl silane solution were added to 30 pounds of aluminum oxide abrasive and the treated abrasive was heated 6 hours at 125° C. and 1 hour at 275° C. prior to use in making wheels.

These wheels were made according to the following formula:

| | |
|---|---|
| Silicone treated aluminum oxide abrasive 16 grit | 89.9 weight percent. |
| Powdered two stage phenolic resin | 7.4 weight percent. |
| Cryolite | 2.1 weight percent. |
| Calcium oxide | 0.6 weight percent. |
| Furfural | 45 cc./lb. of resin. |
| Neutral anthracine oil | 45 cc./lb. of resin. |

Companion wheels were also made with untreated abrasive in otherwise identical manner. All the wheels were cured to 185° C. maximum temperature.

Test results on one set of wheels were as follows:

| Wheel Bond | Abrasive | Speed test to destruction (s.f.p.m.) | | Wet strength improvement |
| --- | --- | --- | --- | --- |
| | | Dry | Wet, soaked 10 days at room temp. in water | |
| Phenolic resin | Untreated | 18,200 | 16,600 | |
| Do | Treated | 18,200 | 14,800 | [1] −1,800 |

[1] Decrease.

The speed strength results of Example IV wheels should be consulted for comparative data on wheels bonded with rubber-phenolic resin bond.

The results of all these comparative tests show that the vinyl silicones which I have employed advantageously in making improved wheels with rubber-phenolic resin bond, do not work at all satisfactorily with phenolic resin bond alone.

A very small amount of alkenyl silicone is sufficient to achieve improved results. The examples given demonstrate large advantages for the coating of abrasive with vinyl silicone in the general range of from about $10^{-7}$ grams of silicone/cm.$^2$ of abrasive surface area to about $10^{-5}$ grams/cm.$^2$. This is known from the calculations made on the surface area of abrasives of various grit sizes and the amounts of silicones used in treating them. Since alkenyl silane derivative is the active material of the silicone, it is estimated that the silicone residue on treated abrasive should be at least 50% alkenyl silane derivative for best results. These data indicate that an addition of an amount of vinyl silicone as large as $5 \times 10^{-3}$ grams/cm.$^2$ of abrasive surface of the grains would continue to show improved results in that the improvement with $10^{-6}$ grams and $10^{-5}$ grams of vinyl silicone/cm.$^2$ of abrasive surface has levelled off but not seriously decreased. However, it does not seem satisfactory from a manufacturing point of view to use amounts of vinyl silicone in excess of 25% to 50% by weight of the abrasive. Allyl and other alkenyl silicones would have similar limits.

Amounts of about $6 \times 10^{-7}$ grams of vinyl silicone have resulted in a strength improvement of 42% as shown for results of Example II. It appears that a minimum amount of about $10^{-8}$ grams per square centimeter of abrasive surface area would be desirable for alkenyl silicone to show measurable improvement of results over untreated abrasive.

In this invention the silane is defined as

where R is an alkenyl group, such as vinyl or allyl, which is capable of reacting with the unsaturated polymers; and where C is a hydrolyzable group such as methoxy, ethoxy, propoxy, butoxy, methoxy ethoxy, fluorine, chlorine, bromine, iodine, or hydrogen; and where A and B can be the same or different groups and can be any of these or other nonreactive toward unsaturated polymer or nonhydrolyzable groups. I use the words "alkenyl group" to describe the unsaturated organic chemical group of "alkenes" as described by Fieser and Fieser, "Organic Chemistry," second edition, 1950, published by D. C. Heath and Company, page 55.

Hydrolysis of a silane results in the formation of silanols. The silanol formed is dependent upon the number of hydrolyzable groups attached to silicon in the silane; the three possibilities being:

I. Where C is the only hydrolyzable group, a silanemonol results—

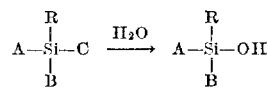

II. Where A and C are both hydrolyzable, a silanediol results—

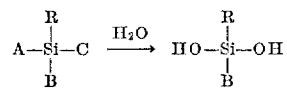

III. Where A, B, and C are hydrolyzable, a silanetriol results—

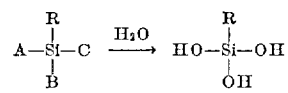

It is obvious to one skilled in the art that silanols are highly reactive and readily condense to form siloxanes.

I. Silanemonol:

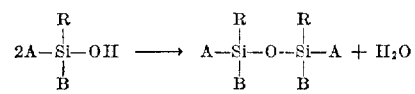

II. Silanediol:

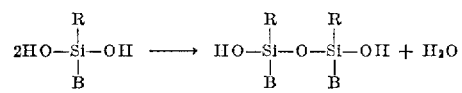

III. Silanetriol:

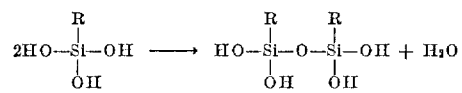

It is likewise obvious to one skilled in the art that in cases II and III, the condensation of the silanediol and silanetriols can continue to form polymers of higher molecular weight of general formulas, respectively:

(II)

(III)

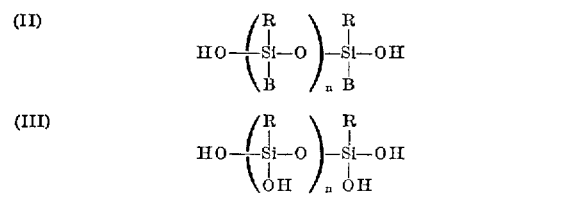

It is also likewise obvious to one skilled in the art that condensation products of silanediols contain cyclic structures as well as long chain structures, and that condensation products of silanetriols contain cross linked and cyclic structures as well as long chain structures.

We prefer to designate all siloxanes in terms of the general formula where $n$ stands for any whole number:

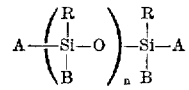

realizing that in cyclic or cross linked structures, the ratios B/Si and A/Si are less than indicated in our general formula.

It is the vinyl group, $CH_2=CR$ which links with the unsaturated group of the rubber etc., and the OH group (hydroxyl) which bonds or attaches itself, I do not know just how, to the abrasive. Rubber (the monomer, isoprene) has the following structure:

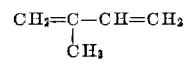

and polymerizes to:

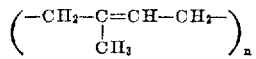

and butadiene monomer has the following structure:

and polymerizes to:

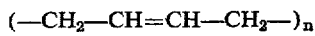

and it is the double bond which links with the double bond of the vinyl group of the resin as well as with the sulphur.

Other organic compounds having an unsaturated group (double bond) will react (cross link) in the same way with the vinyl group of the vinyl polysiloxane resin.

In the examples, the bond was rubber-phenolic resin bond. The various abrasive wheels were porous. The exact porosity I do not know but in accordance with one aspect of the invention the total porosity was at least 10%. For thick wheels it is considered that the open interconnecting porosity is probably at least about 5% when the silicone demonstrates a sizable advantage in soaked wet strength over unsoaked dry strength. But for thinner wheels in which weakening due to the soaking effect takes place at the wheel surfaces and where longer time soaking particularly at higher temperatures is likely to bring out effects not otherwise so important, surface effects play a larger percentage part relative to effects influencing the whole body of the wheels. Bonds containing polymer having unsaturation are such as natural rubber, isoprene, butadiene, butadiene acrylonitrile, butadiene styrene, chloroprene, polyester resin. These may constitute the sole bond in the grinding wheel or be part of the bond along with various resins such as phenolic resin, shellac, aniline formaldehyde resin, vinyl butyral resin, epoxy resin, coumarone-indene resin, either singly or in combination. Sulphur and other vulcanizing agents that may be present become part of the bond to the extent that they enter into the bonding reactions, and likewise plasticizers and dampening agents become part of the bond to the extent that they remain in the grinding wheel after the baking operation is completed. Fillers and various other addition agents of kind and amount well known to the art may be present but are not considered to be part of the bond which I consider to consist of the unsaturated organic polymer or unsaturated organic polymer plus resin. The true cementing ingredients constitute the bond as defined herein, independent of the presence or absence of fillers or other non-cementing addition agents.

The bond may be made with mixtures having different relative proportions of unsaturated organic polymers and resins. Surprisingly, as little as 3% to 6% by weight of unsaturated polymer may be employed along with 97% to 94% by weight of resin to form the bond of grinding wheels and yet impart useful grinding characteristics to the products compared to corresponding wheels made entirely with resin as bond. For good results, therefore, it appears that unsaturated polymer should be present in the amount of at least about 5% by weight of the non-abrasive solids. The adhesive strength of the bond to the abrasive, particularly under wet conditions, is improved by the use of the herein described silicones even though only the above small amounts of unsaturated polymer are present, although a resin bond itself alone is not so improved.

Baking temperatures and times will vary greatly with the wheel composition including such factors as type and amount of unsaturated polymer and resin, if any, and of vulcanizing agent and curing catalyst, if used, the size and shape of the products, the manner of setting used in the ovens, etc. Curing may be carried out for long times at relatively low oven temperatures or short times at high temperatures. In general, small articles can be cured satisfactorily in very short times. Since all parts of small products are very close to their surfaces, the heat can penetrate rapidly and volatiles can escape easily. Interconnection pores may permit faster cures. Thick wheels and dense settings require more time for the heat to penetrate. Ovens may be heated by gas, steam or electricity. Dielectric heat may be useful. All this is well known to those skilled in the art. Maximum curing temperatures may vary in the range from about 120° C. to about 200° C. to mature the bond.

The exact mechanism by which my use of the specified silicone achieves the improved results is not exactly known. But I believe that the silicone attaches itself or is adsorbed on the abrasive surface and this effect takes place to some degree even when the silicone is mixed with liquid ingredients and the mixture is applied to the abrasive grain, instead of coating the grain with the silicone alone as has been done in most of the examples. The alkenyl group in the silicone is believed to attach itself to the unsaturated polymer in the bond.

The grinding wheels of the examples were made with #46 and #60 abrasive grain sizes. This means that the grain was approximately sized with screens having 46 and 60 meshes to the inch, respectively. Grinding wheels made with grain sizes about #220 and coarser down to the very coarse sizes, are usable in my invention. Such sizes have low surface areas less than one square meter per gram, and differ very markedly from fine particles which are powders and dusts often having surface areas of several hundred square meters per gram. My improved grinding wheels have been demonstrated to be safer to use, more durable, and to have greater utility for wet grinding. The grinding operation imposes stresses and strains directly upon the abrasive grains tending to tear them away from the bonding and my improved wheels resist these forces more strongly with lowered rate of wheel wear while, at the same time, they have been shown to have a desirable grinding action.

Organic bonded abrasive articles may have weight percents of abrasive in them that include as much as about 99% or as little as 5% or even less depending upon such factors as the use for which the article is designed, the grain size of the abrasive, etc. Most abrasive articles will fall into the grain size range from about #4 grit to about #220 grit. At least 50% of the abrasive weight is alumina and silicon carbide in most resin-bonded grinding wheels and the weight of abrasive in them is at least 50% of their total weight.

The hardness of an abrasive may be expressed on the Knoop scale, often abbreviated into "$K_{100}$," meaning the penetration hardness obtained with a special diamond-shaped diamond indenter under a load of 100 grams. The hardness number varies inversely as the penetration. Some typical $K_{100}$ values for some abrasives are $B_4C$ 2800, SiC 2500, $Al_2O_3$ 2000, garnet 1350, $ZrO_2$ 1200. The definition of abrasives can vary, but one definition that can be written is to say that the Knoop hardness is at least 1000. The examples employed fused aluminum oxide and crystalline silicon carbide, but other abrasives such as other oxides and other carbides, etc. may be used.

It is hard to pick the best mode of the invention. It is well known that for grinding material A a certain grinding wheel may be the best which would be inferior for grinding material B which is better ground with another kind of grinding wheel. Even for grinding the same material, conditions vary, such as wheel speed, pressure and others. However to comply with the statute I pick Example IV.

It will thus be seen that there has been provided by this invention unsatuarted polymeric organic bonded grinding wheels and other abrasive products in accordance with which the various objects hereinabove set forth together with many thoroughly practical advantages are successfully achieved. As many possible embodiments may be made of the above invention and as many changes might be made in the embodiment above set forth, it is to be understood that all matter hereinbefore set forth is to be interpreted as illustrative and not in a limiting sense.

I claim:

1. An organic bonded abrasive article comprising abrasive grains having a Knoop hardness greater than 1000 and unsaturated polymer bond selected from the group consisting of rubber mixed with phenolic resin, polymers and copolymers of butadiene, said polymer bond being adhered to the abrasive grains with the aid of a previous applied organo functional alkenyl polysiloxane coating on said grains, at least 5% by weight of said article being composed of abrasive grains selected from the group consisting of $Al_2O_3$ and SiC and mixtures thereof, said polysiloxane being derived from the basic silane structure

where R is an alkenyl group selected from the class consisting of vinyl and allyl capable of reacting with unsaturated polymer, C is a hydrolyzable chemical compound selected from the group consisting of methoxy, ethoxy, propoxy, butoxy, methoxy ethoxy, fluorine, chlorine, bromine, iodine, and hydrogen, and A and B are the same or different chemical groups selected from the group consisting of R and C and chemical groups non-reactive toward unsaturated polymer and non-hydrolyzable, said article having superior water resistance compared to a similar article having no alkenyl polysiloxane coating on said grains.

2. Raw batch for the manufacture of abrasive products of improved water resistance bonded with unsaturated polymer selected from the group consisting of rubber mixed with phenolic resin, polymers and copolymers of butadiene, said polymer bond comprising abrasive grain having a Knoop hardness greater than 1000 and selected from the group consisting of $Al_2O_3$ and SiC and mixtures thereof for at least 5% of the weight of the batch calculated to a matured basis, silicone material previously coated on said abrasive grains and upon which initial coating said unsaturated polymer bond is applied and selected from the group consisting of silane, hydrolyzed silane, siloxane, and mixtures thereof derived from the basic silane structure

where R is an alkenyl group selected from the class consisting of vinyl and allyl capable of reacting with unsaturated polymer, C is a hydrolyzable chemical compound selected from the group consisting of methoxy, ethoxy, propoxy, butoxy, methoxy ethoxy, fluorine, chlorine, bromine, iodine, and hydrogen, and A and B are the same or different chemical groups selected from the group consisting of R and C and chemical groups non-reactive toward unsaturated polymer and non-hydrolyzable, said silicone material upon the grains and upon which the unsaturated polymer bond is applied being in amount of at least $10^{-8}$ grams per square centimeter of abrasive grain surface, and unsaturated polymer in amount of at least about 5% by weight of the non-abrasive solids.

3. Raw batch for the manufacture of abrasive products of improved water resistance bonded with unsaturated polymer selected from the group consisting of rubber mixed with phenolic resin, polymers and copolymers of butadiene, said polymer bond comprising abrasive grain having a Knoop hardness greater than 1000 selected from the group consisting of $Al_2O_3$ and SiC and mixtures thereof for at least 5% of the weight of the batch calculated to a matured basis, in which at least 50% of the abrasive grain weight is selected from the group consisting of aluminum oxide and silicon carbide abrasive and mixtures thereof, of grain size in the range about #220 and coarser, unsaturated polymer in amount of at least about 5% by weight of the non-abrasive solids, and silicone derived from vinyl silane and being in the form of a coating on said grain over which said unsatuarted polymer bond is applied, said silicone being in amount of about $10^{-7}$ to about $10^{-5}$ grams per square centimeter of abrasive grain surface corresponding to at least 50% of the silicone coating constituent by weight.

4. Process for manufacturing a bonded abrasive product of superior water resistance including the steps of initially coating abrasive grains selected from the group consisting of $Al_2O_3$ and SiC and mixtures thereof with an amount, at least $10^{-8}$ grams per square centimeter of abrasive surface, of silicone selected from the group consisting of silane, hydrolyzed silane, siloxane and mixtures thereof, derived from the basic silane structure

where R is an alkenyl group selected from the class consisting of vinyl and allyl capable of reacting with unsaturated polymer, C is a hydrolyzable chemical compound selected from the group consisting of methoxy, ethoxy, propoxy, butoxy, methoxy ethoxy, fluorine, chlorine, bromine, iodine, and hydrogen, and A and B are the same or different chemical groups selected from the group consisting of R and C and chemical groups non-reactive toward unsaturated polymer and non-hydrolyzable, adding unsaturated polymer to said silicone coating previously applied to said grains, said polymer being selected from the group consisting of rubber mixed with phenolic resin, polymers and copolymers of butadiene, said polymer bond being in amount of at least about 5% by weight of the non-abrasive solids, thoroughly mixing the ingredients, compacting the mixture to form an article therewith, maturing the article by baking in the temperature range from about 120° C. to about 200° C., thus maturing the unsaturated polymer bond.

5. Process for manufacturing a grinding wheel of superior water resistance including the steps of initially coating abrasive grains having a Knoop hardness greater than 1000, at least 50% by weight of which are selected from the group consisting of $Al_2O_3$ and SiC and mixtures thereof, of grain size in the range about #220 and coarser, with an amount of about $10^{-7}$ to about $10^{-5}$ grams per square centimeter of abrasive surface with silicone derived from vinyl silane for at least 50% of the silicone coating constituent by weight, adding unsaturated polymer to said silicone coating previously applied to said grains, said polymer being selected from the group consisting of rubber mixed with phenolic resin, polymers and copolymers of butadiene, said polymer bond being in amount of at least about 5% by weight of the non-abrasive solids, thoroughly mixing the ingredients, compacting the mixture to form an article therewith, maturing the article by baking in the temperature range from about 120° C. to about 200° C., thus maturing the unsaturated polymer bond.

6. An organic bonded abrasive article as defined in claim 1 wherein the polysiloxane is derived from vinyl silane.

References Cited in the file of this patent

UNITED STATES PATENTS

| | | |
|---|---|---|
| 2,859,198 | Sears et al. | Nov. 4, 1958 |
| 2,878,111 | Daniels et al. | Mar. 17, 1959 |
| 2,881,064 | Rankin et al. | Apr. 7, 1959 |
| 2,882,505 | Feder | Apr. 14, 1959 |

FOREIGN PATENTS

| | | |
|---|---|---|
| 643,964 | Great Britain | Oct. 4, 1950 |
| 644,337 | Great Britain | Oct. 11, 1950 |

UNITED STATES PATENT OFFICE
CERTIFICATE OF CORRECTION

Patent No. 3,098,730                               July 23, 1963

Robert A. Rowse

It is hereby certified that error appears in the above numbered patent requiring correction and that the said Letters Patent should read as corrected below.

Column 1, line 61, for "$=\dfrac{gms.silicone/lb.abras.}{/h}$" read -- $=\dfrac{gms.silicone/lb.abras.}{k/h}$ --; column 4, first table, under "Mix number" line 2 thereof, for "grid" read -- grit --.

Signed and sealed this 14th day of April 1964.

(SEAL)
Attest:

ERNEST W. SWIDER                             EDWARD J. BRENNER

Attesting Officer                               Commissioner of Patents